United States Patent
Battey et al.

(12)

(10) Patent No.: US 6,793,329 B2
(45) Date of Patent: *Sep. 21, 2004

(54) ELECTRICAL AND FLUIDIC INTERFACE FOR AN INK SUPPLY

(75) Inventors: Robert L. Battey, Vancouver, WA (US); Michael L. Bullock, San Diego, CA (US); John A. Barinaga, Portland, OR (US); James E. Clark, Albany, OR (US); John A. Underwood, Sant Cugat Del Vailes Barcelona (ES); Paul David Gast, Camas, WA (US); Susan M. Hmelar, Corvallis, OR (US); David O. Merrill, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/812,158

(22) Filed: Mar. 19, 2001

(65) Prior Publication Data

US 2001/0010532 A1 Aug. 2, 2001

Related U.S. Application Data

(63) Continuation of application No. 08/791,290, filed on Jan. 30, 1997, now Pat. No. 6,203,147, which is a continuation-in-part of application No. 08/584,499, filed on Jan. 8, 1996, now Pat. No. 5,699,091, which is a continuation-in-part of application No. 08/363,188, filed on Dec. 22, 1994, now Pat. No. 5,491,540.

(51) Int. Cl.[7] .............................................. B41J 2/175
(52) U.S. Cl. ...................................................... 347/86
(58) Field of Search ........................... 347/49, 50, 85–87

(56) References Cited

U.S. PATENT DOCUMENTS

| 4,162,501 A | 7/1979 | Mitchell et al. |
| 4,183,031 A | 1/1980 | Kyser et al. |
| 4,253,103 A | 2/1981 | Heinzl et al. |
| 4,475,116 A | 10/1984 | Sicking et al. |
| 4,511,906 A | 4/1985 | Hara |
| 4,568,954 A | 2/1986 | Rosback |
| 4,633,274 A | 12/1986 | Matsuda |
| 4,737,801 A | 4/1988 | Ichihashi et al. |
| 4,760,409 A | 7/1988 | Kiyohara et al. |
| 4,831,389 A | 5/1989 | Chan |
| 4,888,602 A | 12/1989 | Watanabe et al. ............ 346/134 |
| 5,049,898 A | 9/1991 | Arthur et al. |
| 5,162,818 A | 11/1992 | Karita et al. ................... 347/50 |
| 5,221,935 A | 6/1993 | Uzita |
| 5,307,091 A | 4/1994 | DeCoste, Jr. |
| 5,367,328 A | 11/1994 | Erickson ........................ 347/7 |
| 5,488,401 A | 1/1996 | Mochizuki et al. ............ 347/86 |

(List continued on next page.)

FOREIGN PATENT DOCUMENTS

| EP | 0789322 A2 | 8/1997 | .......... G06K/15/00 |
| EP | 0854043 A2 | 12/1997 | |
| EP | 0854045 A2 | 12/1997 | |
| GB | 2316657 A | 3/1998 | ............ B41J/2/175 |
| GB | 2321220 A | 7/1998 | ............ B41J/2/175 |
| GB | 2321623 A | 8/1998 | ............ B41J/2/175 |

*Primary Examiner*—Michael Nghiem (57) ABSTRACT

The present invention is a replaceable ink container for use in an off-axis printing system. The printing system is responsive to electrical signals from the replaceable ink container for controlling printer parameters. The ink container has a leading edge and a trailing edge relative to the direction of insertion into the printing system. The replaceable ink container includes a plurality of electrical contacts disposed on the leading edge toward a first side. The plurality of electrical contacts are configured for engaging corresponding electrical printer contacts associated with the printing system. Also included is a fluid outlet disposed on the leading edge toward a second side opposite the first side and spaced from the plurality of electrical contacts. The fluid outlet is in fluid communication with the replaceable ink container. The fluid outlet is configured for engaging a fluid inlet associated with the printing system.

12 Claims, 7 Drawing Sheets

U.S. PATENT DOCUMENTS

| | | |
|---|---|---|
| 5,506,611 A | 4/1996 | Ujita et al. .................. 347/86 |
| 5,512,925 A | 4/1996 | Ohashi ....................... 347/86 |
| 5,512,926 A | 4/1996 | Uchikata et al. ............. 347/86 |
| 5,699,091 A | 12/1997 | Bullock et al. .............. 347/19 |
| 5,788,388 A * | 8/1998 | Cowger et al. ............. 400/703 |
| 5,812,156 A | 9/1998 | Bullock et al. .............. 347/19 |
| 5,860,363 A * | 1/1999 | Childers et al. ............ 101/483 |
| 6,142,617 A * | 11/2000 | Barinaga et al. ............. 347/85 |
| 6,168,262 B1 * | 1/2001 | Clark et al. .................. 347/50 |
| 6,203,147 B1 * | 3/2001 | Battey et al. ................ 347/86 |
| 2002/0057317 A1 * | 5/2002 | Cowger et al. ............... 347/86 |

* cited by examiner

ELECTRICAL AND FLUIDIC INTERFACE FOR AN INK SUPPLY

CROSS-REFERENCE TO RELATED APPLICATIONS

This is a continuation of application Ser. No. 08/791,290 filed on Jan. 30, 1997 now U.S. Pat. No. 6,203,147.

This application is a continuation-in-part of U.S. patent application Ser. No. 08/584,499 filed Jan. 8, 1996, entitled "Replaceable Part With Integral Memory For Usage, Calibration And Other Data", now U.S. Pat. No. 5,699,091, which is a continuation-in-part of U.S. patent application Ser. No. 08/363,188 filed Dec. 22, 1994, entitled "Replaceable Part With Integral Memory For Usage And Calibration Data", now U.S. Pat. No. 5,491,540; and this application is related to commonly assigned applications filed herewith entitled "Ink Container Configured For Use With Printer", Ser. No. 08/789,959, filed Jan. 30, 1997, and Patent Application entitled "Electrical Interconnect For Replaceable Ink Containers", Ser. No. 08/789,958, now U.S. Pat. No. 6,168,262 filed Jan. 30, 1997, and Patent Application entitled "Ink Container Configured For Use With Compact Supply Station", Ser. No. 08/789,957 now U.S. Pat. No. 6,142,417 filed Jan. 30, 1997, the entire contents of which are incorporated by reference herein.

BACKGROUND OF THE INVENTION

The present invention relates to replaceable ink supply containers for providing ink to printers. More specifically, the present invention relates to ink containers having both a fluid outlet and a plurality of electrical contacts which must make a highly reliable fluid and electrical interconnect with a printing system.

Ink-jet printers frequently make use of an ink-jet printhead mounted to a carriage which is moved back and fourth across a print media, such as paper. As the printhead is moved across the print media, a control system activates the printhead to eject, or jet, ink droplets onto the print media to form images and characters.

Previously, printers have made use of an ink container that is separably replaceable from the printhead. When the ink cartridge is exhausted the ink cartridge is removed and replaced with a new ink container. The use of ink containers allows the user to separately replace the ink container without replacing the printhead, thereby allowing printing until the end of printhead life.

As a benefit to the user of the printer information is sometimes stored on these ink containers to maximize the quality of the output image as well as improve the printers ease of use. For example, U.S. Pat. No. 5,506,611 to Ujita et al discloses the use of an ink container having a memory device located thereon for storing printer parameters. More specifically, the Ujita reference discloses the use of storing printhead drive conditions in the memory on the ink container. Once the ink container is inserted into the printer these drive conditions are read by the printer to determine optimum printhead drive conditions for the particular ink associated with the ink container. These drive conditions include drive voltage, pulse width, frequency, and the number of preliminary discharges. In this manner, the printer is optimized for printing the particular ink without requiring the user to manually adjust these drive conditions.

One problem associated with the use of electric terminals for transferring information between the ink container and the printer as discussed in Ujita is that electric terminals are subject to contamination. Once the electric terminals are contaminated, the electrical connection between the ink container and the printer may be unreliable. One source of contamination for these electric terminals is the ink contained within the ink container. As the ink container is inserted into the printer the ink container makes a fluid interconnect with the printer. As the ink containers are swapped in and out for different applications, ink from the ink containers can spill or splatter. If this ink finds its way to the electric terminals on the ink container the reliability of the electrical interconnect between the ink cartridge and the printer may be reduced. Once the electrical interconnect between the ink cartridge and the printer fails or is shorted by fluid such as ink, then the quality of the output image may be reduced.

Another source of contamination for the electric terminals on the ink container results from the handling of the ink container. The ink container must be handled to insert the ink container into the printing system. In addition, the ink containers may be swapped in and out depending on the particular application. Some applications require printing on specific media. In this case, the ink must be changed to an ink that is optimized for the particular media chosen. The handling of the ink cartridges can transfer oils and salts frequently present in human skin to the electric terminals on the ink container reducing the reliability of the electrical interconnect between the ink container and the printer. In addition, once the ink container electric terminals are contaminated, this contamination may be transferred to the electric terminals on the printer further reducing the reliability of the electrical interconnect between not only the contaminated ink container, but all subsequent ink containers which are inserted into the printer.

There is an ever present need for ink-jet printing systems which are highly reliable and are capable of providing high quality output images with minimal intervention by the user. These printing systems should be cost effective and have relatively low operating costs. In addition, the ink container should have some form of storage device which contains essential printer parameters which must be changed or compensated for to accommodate the particular ink stored within the ink container. This ink container should contain any additional parameters such as ink supply volume information or drop count information to provide additional benefits. These benefits include low ink warnings to minimize the need for the user to monitor this parameter. For the case where replaceable ink supplies are used, the ink container should be easily inserted into the printer. The ink container should be capable of making reliable fluid connection with the printer without spilling or splattering during insertion and removal. In the event that spilling or leakage of ink occurs, this spilled ink should not contaminate the electrical contacts which can lead to system reliability problems.

The ink container should be capable of making a highly reliable electrical interconnect with the printer for transferring information between the storage device and the printer. This electrical interconnect should be capable of repeated uses without loss of reliability.

SUMMARY OF THE INVENTION

The present invention is a ink container for use in an off-axis printing system. The printing system is responsive to electrical signals from the ink container for controlling printer parameters. The ink container has a leading edge and a trailing edge relative to the direction of insertion into the printing system. The ink container includes a plurality of electrical contacts disposed on the leading edge toward a first side. The plurality of electrical contacts are configured for engaging corresponding electrical printer contacts associated with the printing system. Also included is a fluid outlet disposed on the leading edge toward a second side opposite the first side and spaced from the plurality of electrical contacts. The fluid outlet is in fluid communication with the ink container. The fluid outlet is configured for engaging a fluid inlet associated with the printing system.

In one preferred embodiment the ink container leading edge has a major axis and the first and second sides are disposed on the major axis. In this preferred embodiment the ink container further includes an information storage device that is electrically connected to the plurality of electrical contacts.

Another aspect of the present invention is an ink container for use with a printing portion of an off-axis printing system. The ink container has a docked position for providing ink to the printing portion. In the docked position the printing portion is responsive to electrical signals from the ink container for controlling printer parameters. The ink container includes a fluid outlet portion for providing fluid to the printing portion. The fluid outlet portion is mounted rigidly relative to the ink container. The fluid outlet portion is configured for engaging corresponding guiding features associated with the printing portion to properly align the fluid outlet portion with corresponding fluid inlet portions associated with the printing portion. Also included is an electrical interface portion having a plurality of electrical contacts for transferring information between the ink container and the printing portion. The electrical interface portion including an engagement portion disposed opposite the plurality of electrical contacts. The electrical interface portion in the docked position engaging guiding features associated with the printing portion to position electrical contact portions associated with the printing portion in a biased relationship between the engagement portion and the plurality of electrical contacts to electrically engage the ink container with the printing portion without applying an unbalanced force on the ink container.

In one preferred embodiment the electrical interface portion is in a cavity within an outer surface of the ink container. The cavity having inner surfaces defining the engagement surface and a surface having the plurality of electrical contacts disposed thereon. In this preferred embodiment the ink container has a leading edge and a trailing edge relative to a direction of insertion into the printing portion. Both the fluid outlet portion and the electrical interface portion are disposed on the leading edge of the ink container.

DETAILED DESCRIPTION OF THE PREFERRED EMBODIMENT

Figure 1:
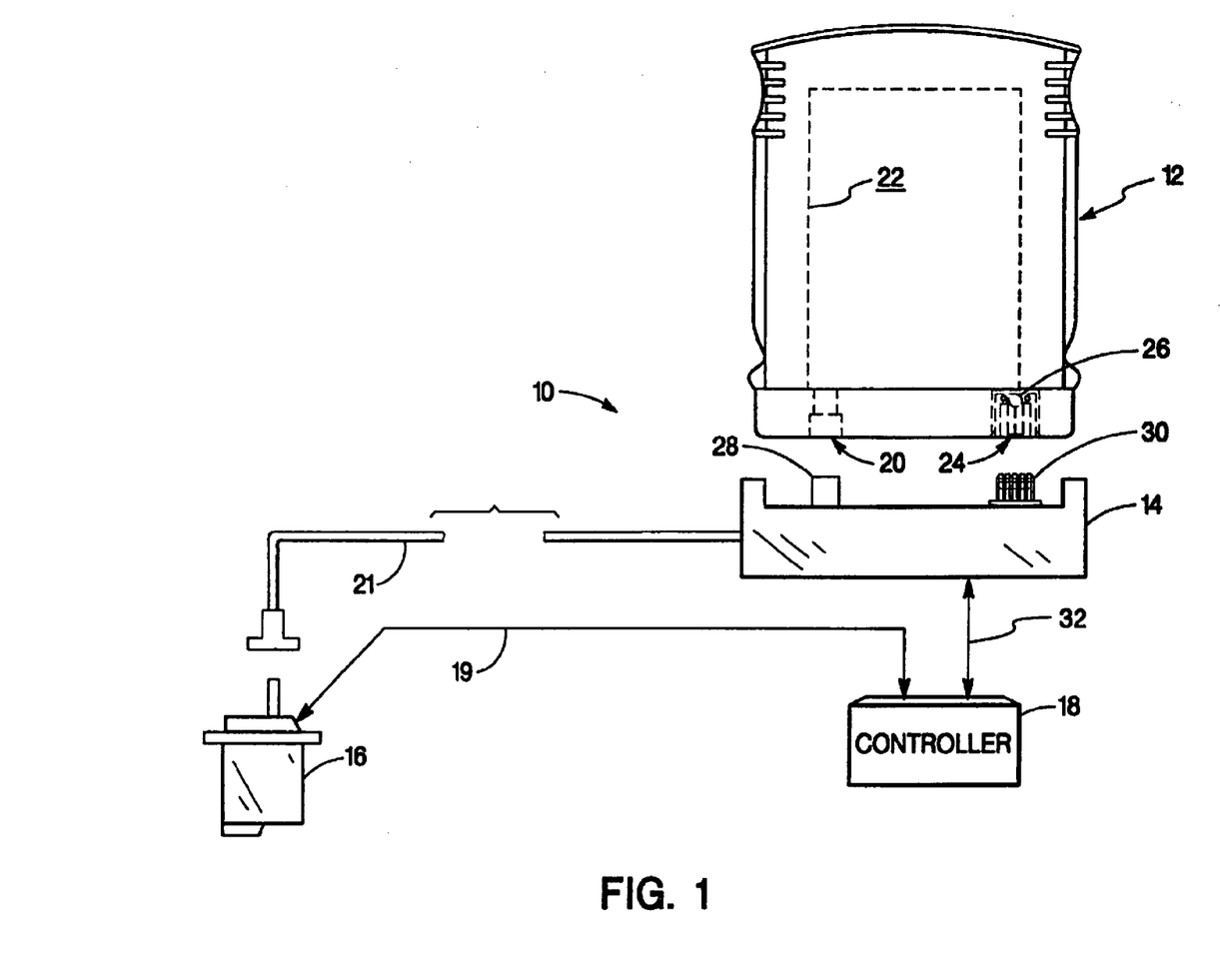
FIG. 1 shows a schematic representation of the printing system showing an ink container of the present invention which forms a fluid interconnect and an electrical interconnect with the printing system.

FIG. 1 is a schematic representation which depicts an ink-jet printing system 10 that includes an ink container 12 of the present invention. The ink-jet printing system 10 also includes an ink container receiving station 14, an ink-jet printhead 16 and a print controller 18. Printing is accomplished by the ejection of ink from the printhead 16 under the control of print controller 18. The printhead 16 is connected to the controller 18 by a link 19 for controlling ejection of ink. Ink is provided to the printhead 16 by way of a fluid conduit 21 which fluidically connects the printhead 16 to the receiving station 14. The ink container 12 includes a fluid outlet 20 which is in fluid communication with a fluid reservoir 22. The ink container 12 further includes electrical contacts 24 which are electrically connected to an information storage device 26.

It is the fluid outlet 20 and the electrical contacts 24 which allow the ink container 12 to reliably interconnect with a fluid inlet 28 and electrical contacts 30, respectively, associated with the ink container receiving station 14. The ink container receiving station 14 enables ink to be transferred from the fluid reservoir 22 associated with the ink container 12 to the printhead 16 via the fluid conduit 21. In addition, the ink container receiving station 14 allows the transfer of information between the information storage device 26 associated with the ink container 12 and the print controller 18 via a link 32.

Figure 2:
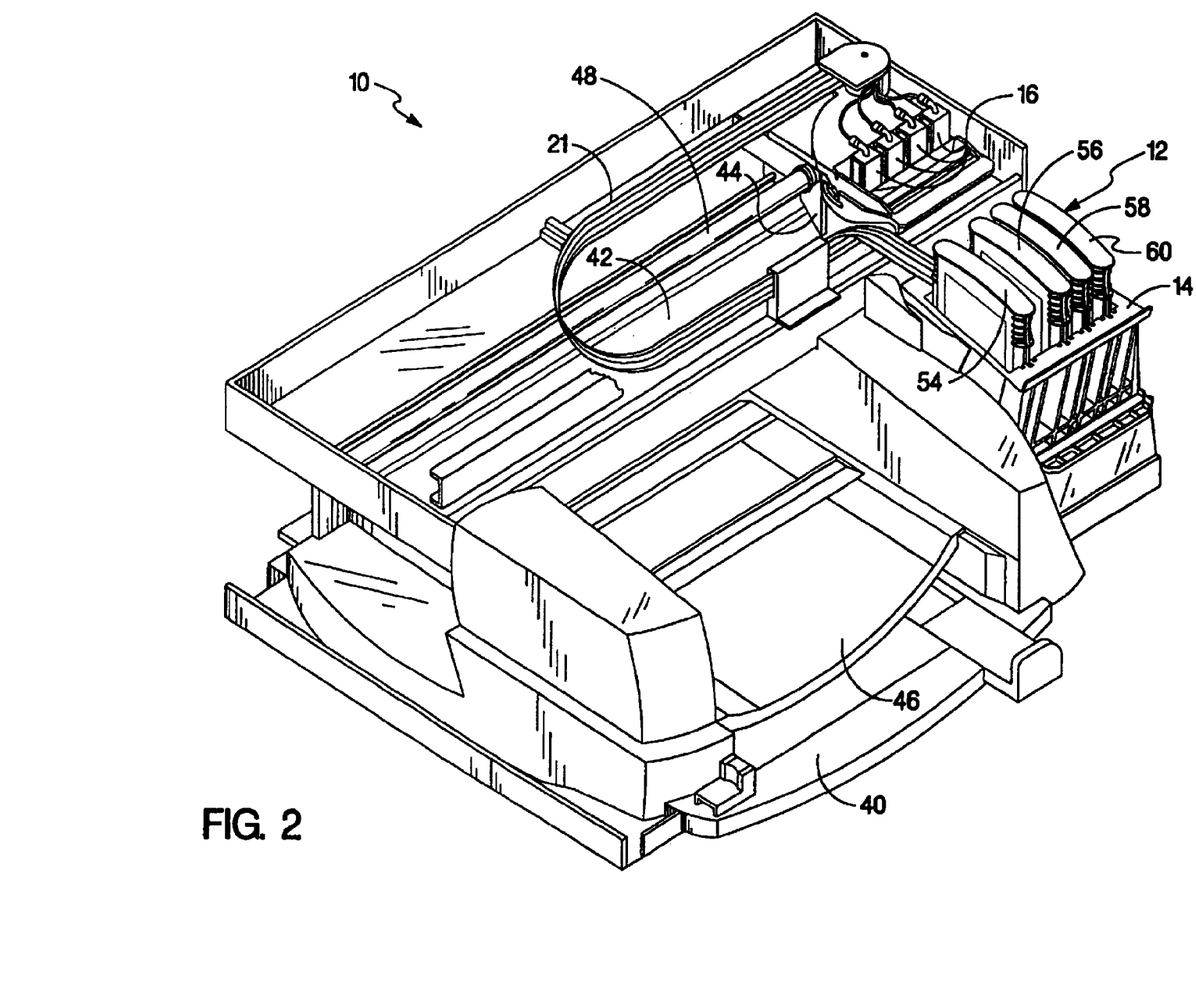
FIG. 2 is a perspective view of a printer "with cover removed", which incorporates the ink container of the present invention.

FIG. 2 depicts a perspective view of one embodiment of a printer 10, with its cover removed, containing one or more ink containers 12 which incorporate the plurality of electrical contacts 24 and the fluid outlet 20 of the present invention, shown in FIG. 1. The electrical contacts 24 and fluid outlet 20 of the present invention provide a very reliable fluid and electrical connection between the printer 10 and the ink container 12.

The printer 10 includes a tray 40 for holding a paper supply. When a printing operation is initiated a sheet of paper from tray 40 is fed into printer 10 using a sheet feeder (not shown). During printing the paper passes through a print zone 42 whereupon a scanning carriage 44, containing one or more printheads 16, is scanned across the sheet for printing a swath of ink thereon. The sheet of paper is stepped through the print zone 42 as the scanning carriage 44 prints a series of swaths of ink to form images thereon.

After printing is complete, the sheet is positioned into an output tray 46, the positioning of the paper supply 40 and the output tray 46 can vary depending on the particular sheet feed mechanism used.

The scanning carriage 44 moves through the print zone 42 on a scanning mechanism which includes a slide rod 48 on which the scanning carriage 44 slides. A positioning means such as a coded strip (not shown) is used in conjunction with a photo detector in the scanning carriage 44 for precisely positioning the scanning carriage 44. A stepper motor (not shown), connected to the scanning carriage 44 using a conventional drive belt and pulley arrangement, is used for transporting the scanning carriage 44 across the print zone 42.

A ribbon cable (not shown) carries electrical signals to the scanning carriage 44 for selectively energizing the printheads 16. As the printheads 16 are selectively energized, ink of a selected color is ejected onto the print media as the scanning carriage 44 passes through the print zone 42.

The present invention relates to the ink containers 12 which provide ink to the printheads 16 for ejection onto print media. The ink containers 12 are referred to as an off-axis ink supply because the ink supply is spaced from a scan axis defined by the scanning carriage 44. This off-axis ink delivery system includes an ink container receiving station 14, for receiving ink containers 12. The ink containers 12, in the case of color printing, are often separate ink containers for each color and a container for black ink. For example the ink container 12 for one preferred embodiment shown in FIG. 2 is an ink container 54 for black ink, an ink container 56 for yellow ink, an ink container 58 for magenta ink, and an ink container 60 for cyan ink. The receiving station 14 contains a mechanical interface, a fluid interface, and an electrical interface so that when the proper ink container 12 is inserted into the receiving station 14 the ink container 12 is latched into place and electrical and fluidic interfaces are accomplished with the printer 10. Ink passes through these fluid interfaces in the receiving station 14 through a fluid conduit 21 such as tubing which fluidly connect the ink containers 54, 56, 58, and 60 with corresponding printheads 16 on the print scanning carriage 44.

Figure 3:
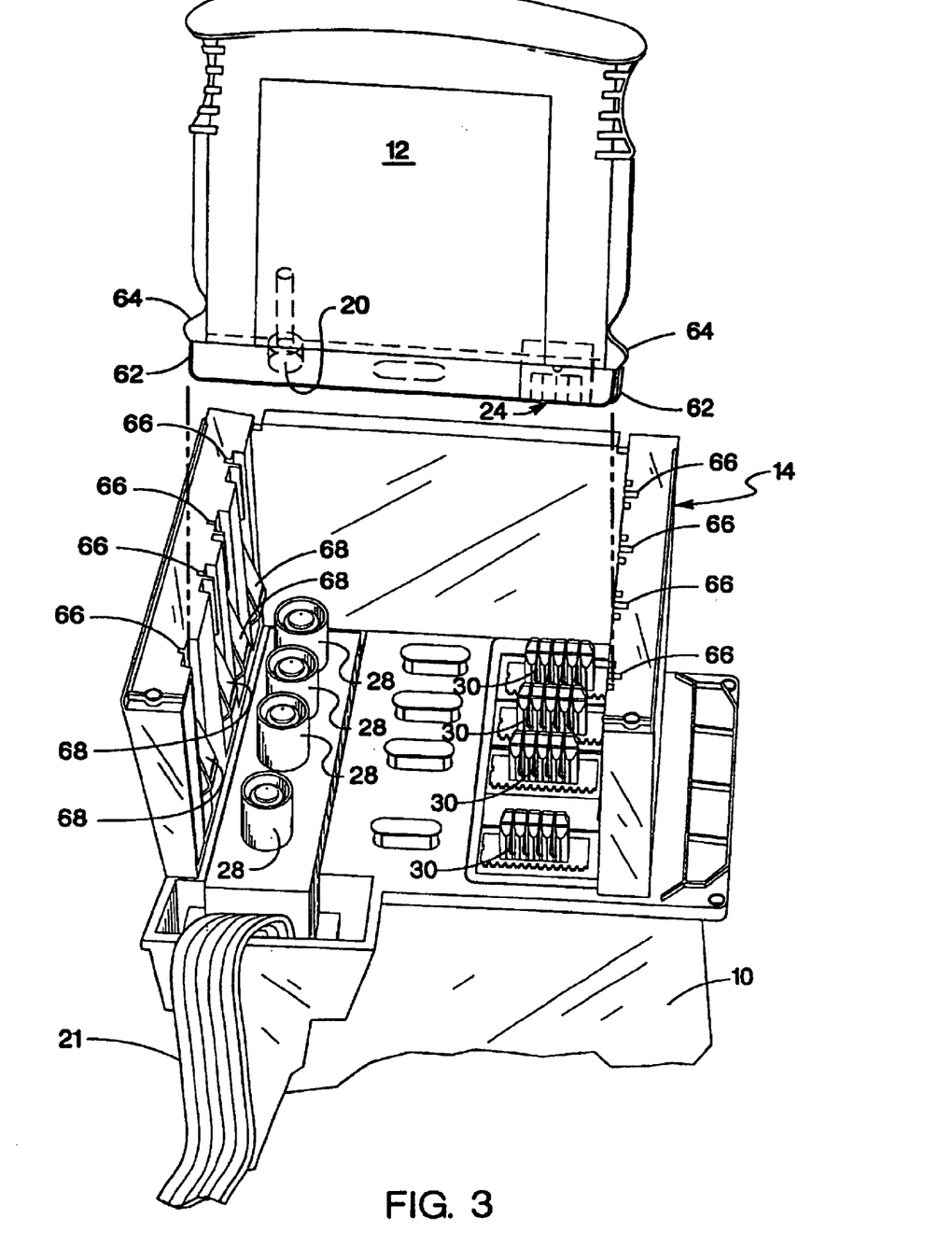
FIG. 3 is an ink container receiving station of the type used in the printer of FIG. 2 shown broken away with an ink container positioned for insertion into the ink container receiving station.

FIG. 3 depicts an ink container 12 of the present invention positioned for insertion into the receiving station 14 of printer 10. The ink container 12 contains a supply of. media marking fluid such as ink. Also included in the ink container 12 is the fluid outlet 20, the plurality of electrical contacts 24, aligning features 62 and latching features 64. The aligning features 62 on the ink container 12 are to assist in aligning the ink container 12 for insertion into the receiving station 14. The aligning features 62 work in conjunction with corresponding aligning features 66 on the receiving station 14. These aligning features 62 and 66 in addition to providing an aligning function, also provide a keying function to ensure that the ink container 12 contains ink having the proper parameters such as proper color and is compatible with the particular printer 10. Keying and aligning features are discussed in more detail in co-pending patent application Ser. No. 08/566,521 filed Dec. 4, 1995 entitled "Keying System For Ink Supply Containers" assigned to the assignee of the present invention, incorporated herein by reference.

Once the proper ink container 12 is properly aligned and inserted into the receiving station 14, a latching feature 68 engages the corresponding latching feature 64 on the ink container 12 to latch the container into the receiving station 14. With the ink container 12 properly latched into the receiving station 14 a fluid inlet 28 associated with the receiving station 14 engages the corresponding fluid outlet 20 on the ink container 12 to allow fluid to flow from the ink container 12 to the printer 10 and ultimately the printhead 16 for printing on print media.

Insertion of the ink container 12 into the receiving station 14 forms both an electrical interconnect and a fluid interconnect between the ink container 12 and the receiving station 14 which is the subject of the present invention. Electrical contacts 24 associated with the ink container 12 engage corresponding electrical contacts 30 associated with the receiving station 14 to allow information to be transferred between the receiving station 14 and the ink container 12. It is the positioning of these electrical contacts 24 on the ink container 12 that allows a highly reliable electrical contact to be formed between the receiving station 14 and the ink container 12.

Figure 4A:
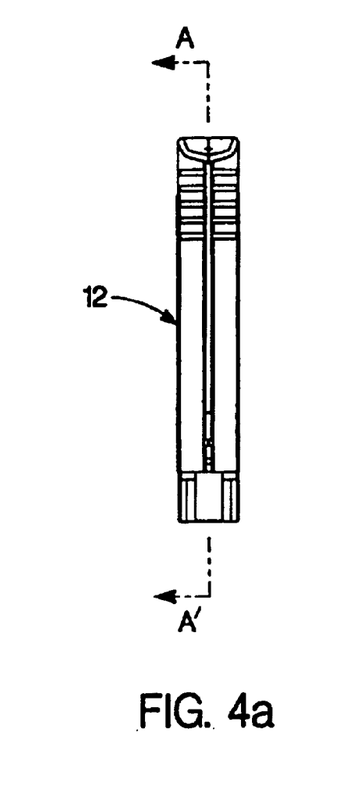
FIGS. 4a, 4b, 4c and 4d are an isometric view of the ink container of the present invention with the electrical interconnect portion shown greatly enlarged.
Figure 4B:
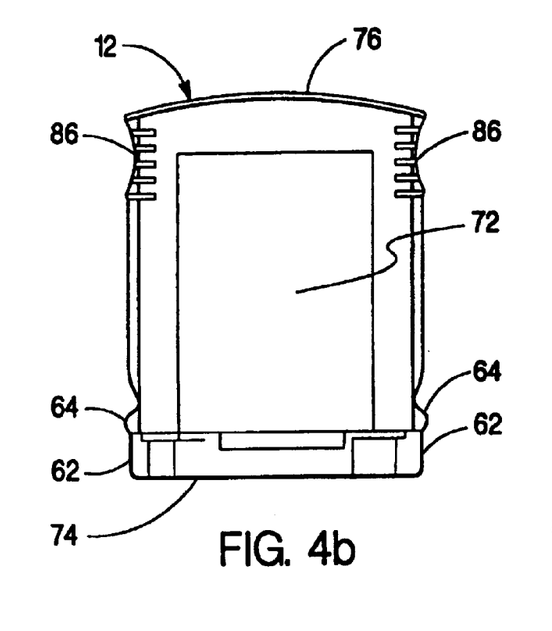
Figure 4C:
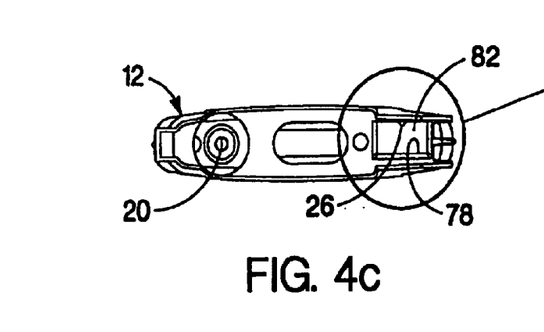

FIGS. 4a, 4b, and 4c depict isometric views of one preferred ink container 12 of the present invention. The ink container 12 includes an outer surface or housing 72 having a leading edge 74 and a trailing edge 76 relative to the direction of insertion of the ink container 12 into the receiving station 14. The outer surface 72 has an inner surface 78 which defines a cavity 80. The outer surface 72 defines an opening 82 into the cavity 80 at the leading edge 74 of the ink container 12. In the preferred embodiment the outer surface 72 of the ink container 12 has beveled edges 84 which at least partially surround the opening 82.

Figure 4D:
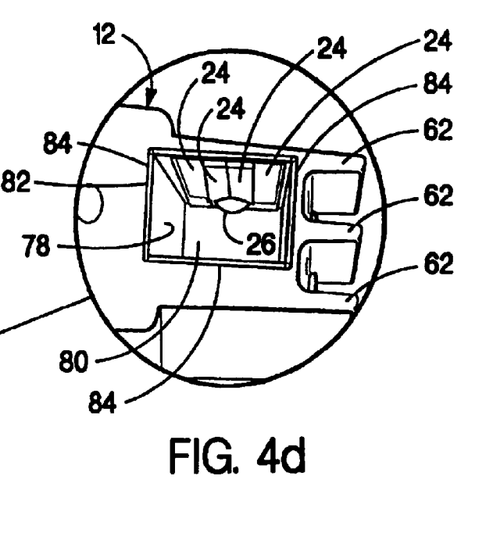

FIG. 4d depicts an enlarged perspective view of the cavity 80 shown in FIG. 4c. The memory device 26 such as a semiconductor memory is disposed on the inner surface 78 of the cavity 80. The memory device 26 is electrically connected to each of the electrical contacts 24. The electrical contacts 24 are configured for engagement with corresponding electrical contacts 30 associated with the receiving station 14.

In this preferred embodiment the opening 82 to the cavity 80 is sized to be small enough to prevent fingers from entering the cavity 80 thereby eliminating or reducing the possibility of inadvertent finger insertion into the cavity 80. The proper sizing of the opening 82 is critical for preventing contamination of the electrical contacts 24 associated with the memory device 26 resulting from the handling of the ink container 12.

Aligning features 62 and latching features 64 are provided on the ink container 12. The aligning features 62 aid in the insertion of the ink container 12 into the receiving station 14. Once the ink container 12 is inserted into the receiving station 14, the latching features 64 engage the spring 68 to secure the ink container 12 into the receiving station 14. (see FIG. 3) In addition, gripping features 86 are provided toward the trailing edge 76 of the ink container 12.

Figure 5:
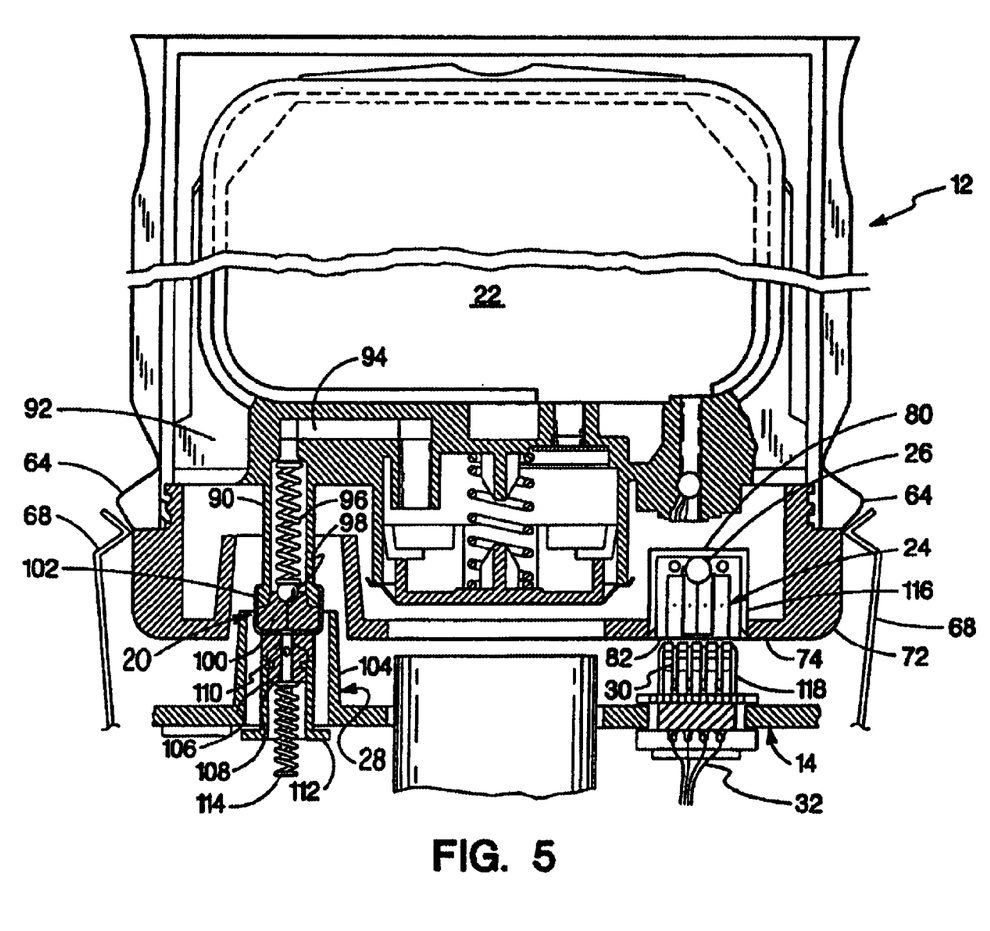
FIG. 5 shows the ink container of FIG. 4 shown in section taken across section line A–A' of FIG. 4a shown partially inserted into the ink container receiving station.

FIG. 5 depicts the ink container 12 of the present invention partially inserted into the ink container receiving station 14 shown broken away. The ink container 12 includes the ink reservoir 22 which is in fluid communication with the fluid outlet 20. Also included in the ink container 12 is electrical contacts 24 which are electrically connected to the storage device 26.

In this preferred embodiment the fluid outlet 20 includes a hollow cylindrical boss 90 that extends downward from the ink container chassis 92. The top to the boss 90 opens into a conduit 94 which is fluidly connected to the ink reservoir 22 thereby providing fluid to the fluid outlet 20. A spring 96 and sealing ball 98 are positioned within the boss 90 and held in place by a compliant septum 100 and a crimp cover 102. The spring 96 biases the sealing ball 98 against the septum 100 to form a fluid seal.

In this preferred embodiment the fluid inlet 28 on the ink container receiving station 14 includes a housing 104 and upwardly extending needle 106 having a closed, blunt upper end, a blind bore 108 and a lateral hole 110. The blind bore 108 is fluidly connected to the lateral hole 110. The lower end of the needle 106 is connected to the fluid conduit 21 for providing ink to the printhead 16 shown in FIG. 1. A sliding collar 112 surrounds the needle 106 and is biased upwardly by spring 114, the sliding collar 112 has a compliant sealing portion with an exposed upper surface and an inner surface in direct contact with the needle 106.

The outer surface 72 of the ink container 12 defines cavity 80 at the leading edge 74 of the ink container 12. Within the cavity 80 a substrate 116 is mounted. The substrate 116 contains the electrical contacts 24 which are positioned facing inwardly into the cavity 80. The electrical contacts 24 are each electrically connected to the information storage device 26. The opening 82 in the leading edge 74 provides access to the electrical contacts 24.

Electrical contacts 30 which correspond to electrical contacts 24 are positioned on the ink container receiving station 14. The electrical contacts 30 are mounted to a connector assembly 118 which floats or is free to move within a limited range of motion. The connector assembly 118 has a plurality of electrical conductors 32 which are electrically connected to each of the electrical contacts 30. The plurality of electrical conductors 32 are electrically connected to the print controller 18 shown in FIG. 1.

As the ink container 12 is inserted into the ink container receiving station 14 the crimp cap 102 is guided into the internal bore of housing 104 by the tapered or beveled edge on the housing 104. As the ink container 12 is further inserted, the alignment of the ink container 12 within the ink container receiving station 14 is then defined by the leading edge or crimp cap 102 of the fluid outlet 20 and the internal bore of the housing 104 of fluid inlet 28. The ink container 12 is pushed downward into the installed position shown in FIG. 6 in which the upwardly extending needle 106 pierces the septum 100 and displaces the sealing ball 98 such that fluid flows into the lateral hole 110 of the needle 106 through the blind bore 108 and into the fluid conduit 21 to the printhead 16.

Figure 6:
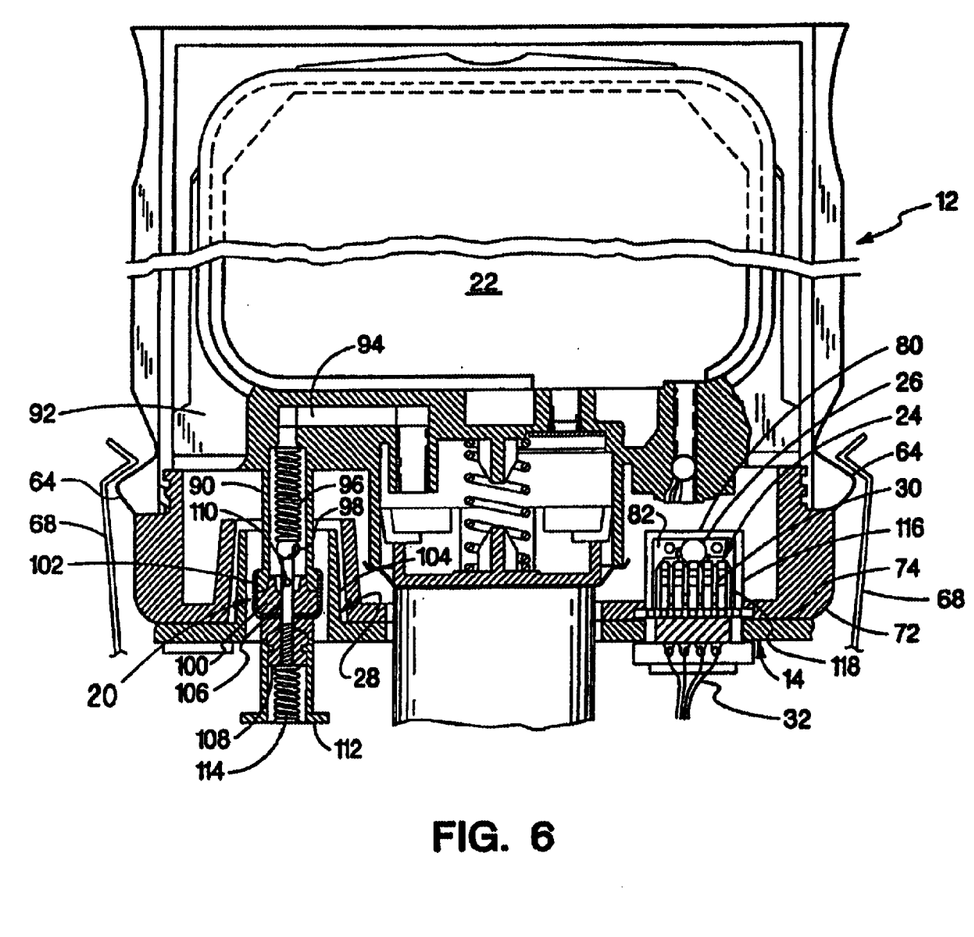
FIG. 6 shows the ink container of FIG. 5 shown fully inserted in a latched position within the ink container receiving station.

Once the ink cartridge 12 is in the installed position engagement portions or leaf springs 68 engage the latching portion 64 on the ink container 12 to firmly hold the ink container 12 in place. Throughout the installation process and in the installed position, the guiding features 62 on the ink container 12 are captured in vertical channels 66 which provide lateral support and stability to the ink container 12 during insertion. It is important that the aligning features 62 on the ink container 12 and the corresponding aligning channels 66 on the ink container receiving station 14 have tight enough tolerances such that the fluid outlet 20 properly locates the ink inlet 28 on the receiving station 14.

Once the fluid outlet 20 finds the housing 104 of the receiving station 14, then the ink container 12 positioning relative to the ink container receiving station 14 is set. It is critical that there is no loading or unbalanced force put on the ink container 12 which disturbs the fluid interconnection between fluid outlet 20 and ink inlet 28. For example, any loading on the ink container 12 which produces a force acting radial to the upright needle portion 106 can result in a separation between the upright needle 106 and the septum 100 resulting in ink leakage between the needle 106 and the septum 100. Therefore, it is critical that the electrical interconnect between the ink container 12 and the ink container receiving station 14 not provide any loading or unbalanced forces on the ink container 12 which may result in ink leakage at the fluid interconnect.

Figure 7:
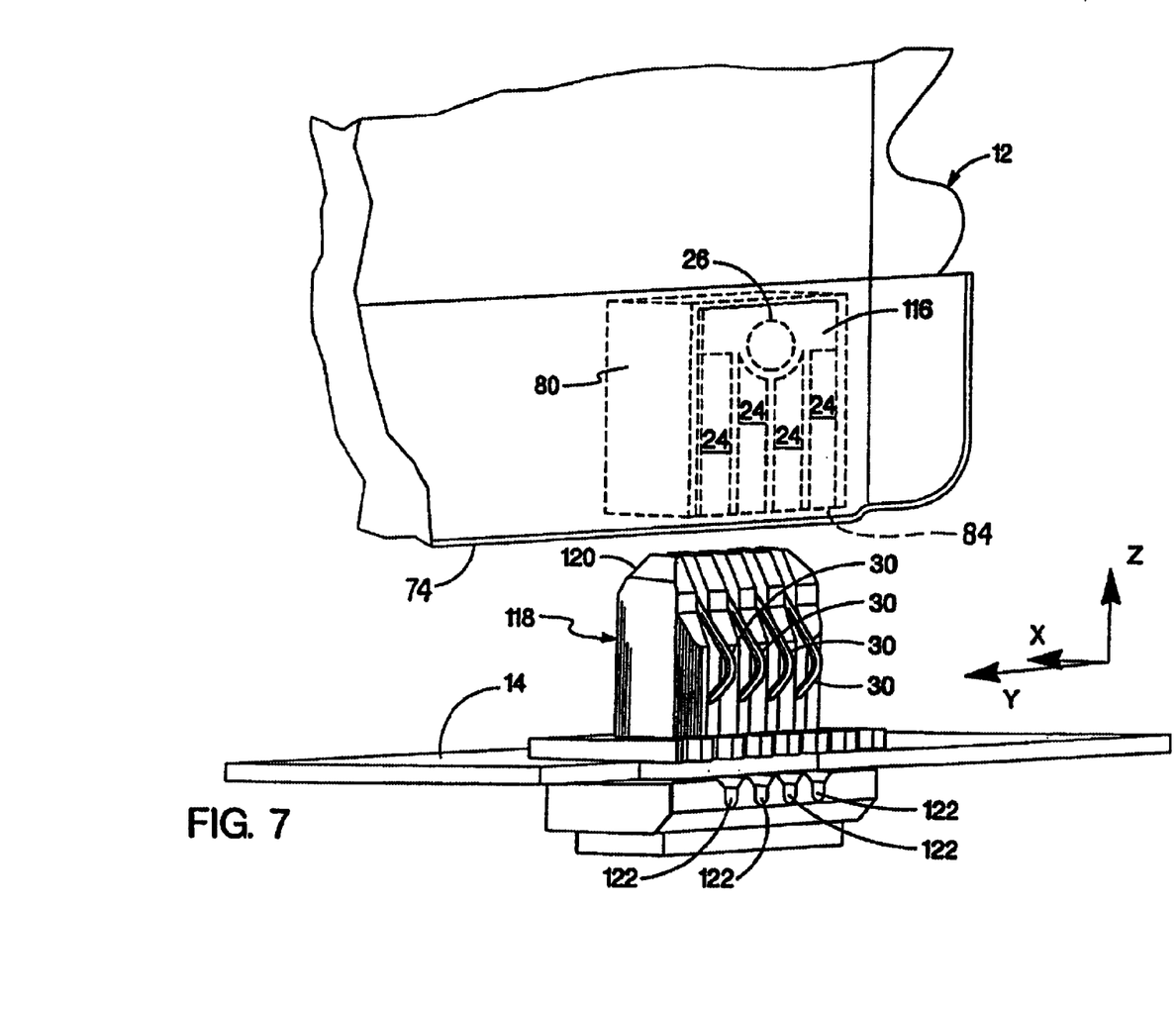
FIG. 7 shows the electrical interface between the ink container of the present invention and the ink container receiving station shown greatly enlarged.

FIG. 7 depicts a greatly enlarged perspective view, shown partially broken away, of the ink container 12 positioned for insertion onto the electrical contacts 30 associated with the ink container receiving station 14. The cavity 80 that is positioned at the leading edge 74 of the ink container 12 is represented by dotted lines. Also shown in dotted lines is the substrate 116, electrical contacts 24, and memory device 26, each of which are positioned within the cavity 80.

The electrical contacts 30 associated with the receiving station 14 are mounted on the electrical connector 118. The electrical connector 118 has a tapered leading edge portion 120 which engages the beveled opening 84 on the leading edge 74 of the ink container 12 to guide the electrical connector 118 into the cavity 80. The electrical connector 118 has the electrical contacts 30 spring biased outwardly from the electrical connector 118. As the ink container 12 is inserted into the receiving station, 14 the electrical contacts 30 are compressed to bias against the electrical contacts 24 on the inner wall of the cavity 80 to form a low resistance electrical connection between the receiving station 14 of the printer 10 and electrical contacts 24 which are electrically connected to the memory 26. The electrical contacts 30 are each electrically connected to a plurality of electrical terminals 122 which are electrically connected to the printer 10.

In one preferred embodiment, the entire electrical connector 118 associated with the receiving station 14 is floating in the two dimensions orthogonal to the direction of ink container 12 insertion. The Z axis in the coordinate system shown represents the direction of ink container 12 insertion. The X and Y axis representing the directions of freedom for the electrical connector 118 during the ink container 12 insertion. During insertion of the ink container 12 into the receiving station 14, the tapered leading edge 120 of the electrical connector 118 engages the opening 82 of the cavity 80. As the ink container 12 is further inserted into the receiving station 14, the electrical connector 118 is free to move along the X and Y axis to properly align with the cavity 80. The electrical spring contacts 30 engage and are biased against the electrical contacts 24 of the ink container 12. In this manner, reliable electrical contact between the ink container 12 and the receiving station 14 is assured.

Insertion of the ink container 12 into the ink container receiving station 14 involves the alignment of the fluid outlet 20 with the fluid inlet 28. Once the fluid outlet 20 and fluid inlet 28 are in alignment, the electrical interconnection between electrical contacts 30 associated with the receiving station 14 and electrical contacts 24 associated with the ink container 12 do not disrupt this alignment. This alignment is maintained because alignment of the electrical connector 118 is accomplished by the positioning of the electrical connector 118 relative to the ink container receiving station 14 and not a change of position of the ink container 12 relative to the ink container receiving station 14. Because the electrical connector 118 is free to move in two dimensions to properly align itself with the cavity 80 there is no loading or unbalanced force placed on the ink container 12 or the fluid outlet 20 during insertion. An unbalanced force placed on the fluid outlet 20 may result in fluid leakage in the fluid interconnect between the ink container 12 and the receiving station 14.

An unbalanced force placed on the fluid outlet 20 can produce nonuniform compression of the compressible sealing material which forms the septum 100 in a region adjacent the upright needle 106. If this compression nonuniformity is sufficient fluid can leak between the septum 100 and the upright needle 106. Unbalanced forces on the fluid outlet 20 which have a force component acting in a direction radial to a central axis of the upright needle 106 are particularly likely to result in fluid leakage. Force components acting radial to the central axis tend to result in much greater compression of the septum 100 on one side of the needle 106 than on the opposite side of the needle tending to result in fluid leakage between the needle and the septum 100 having the least compression.

It is important that there not be any significant loading or unbalanced force on the ink container 12 which results in ink leakage from the fluid outlet 20 and the fluid inlet 28. Although the spring contacts 30 exert a biasing force against the inside wall of the cavity 80, this same biasing force exerts a force on the electrical connector 118 which is equal and opposite to the biasing force on the inside wall of the cavity 80. The electrical connector 118 transmits this equal and opposite biasing force to the inside wall of the cavity 80 opposite the inside wall having the electrical contacts. Therefore, because equal and opposite forces are exerted on the ink container 12 there is no net force or loading placed on the ink container 12 by the electrical connector 118 and therefore, the reliability of the fluid outlet 20 is enhanced as well as its tendency to prevent fluid leakage.

The present invention provides a reliable electrical and fluidic interconnect between the ink container 12 and the ink container receiving station 14. The positioning of both the electrical contacts 24 and fluid outlet 20 on the leading edge 74 of the ink container 12 simplifies the mechanical, fluidic and electrical interfaces between the ink container 12 and the receiving station 14. In addition, the positioning of the electrical contacts 24 in a spaced relationship from the fluid outlet 20 and within the cavity 80 on the leading edge 74 of the ink container 12 helps minimize the risk of contamination of the electrical contacts 24 either by ink which may short the electrical contacts or other forms of contamination such as the handling of the ink container 12 prior to insertion into the printer 10. Contamination due to handling on the ink container 12 can be particularly insidious because this contamination can transfer from the ink container electrical contacts 24 to the electrical contacts 30 associated with the printer 10 in which case simply replacing the ink container 12 may not remedy the problem.

Although one of the preferred embodiments of the present invention makes use of a memory device 26 that requires four electrical contacts 24, memory devices having fewer or greater numbers of electrical contacts 24 may also be used. In addition, this preferred embodiment of the present invention makes use of the electrical contacts 24 which are positioned on the same inner surface within the cavity 80. The electrical contacts 24 may also be positioned on other inner surfaces within the cavity 80 as well.

What is claimed is:

1. A replaceable ink container for use in an off axis printing system, the printing system being responsive to electrical signals produced by the replaceable ink container for controlling printing system narameters, the replaceable ink container having a leading edge defined as that edge of the replaceable ink container first received by the printing system, the replaceable ink container comprising:

a plurality of electrical contacts on a first half of the leading edge at a first side of the leading edge, the plurality of electrical contacts configured for engaging a plurality of corresponding electrical printer contacts of the printing system;

a fluid outlet on a second half of the leading edge at a second side of the leading edge, wherein the first side and the second side are positioned adjacent opposite ends of the leading edge, such that the fluid outlet is separated from the plurality of electrical contacts, the fluid outlet being in fluid communication with the replaceable ink container and configured for engaging a fluid inlet of the printing system;

an information storage device electrically connected to the plurality of electrical contacts; and a latch feature, the replaceable ink container having an unlatched position and a latched position, wherein the latch feature is in engagement with corresponding engagement features of the printing system, the plurality of electrical contacts of the replaceable ink container are in engagement with the plurality of corresponding electrical printer contacts, and the fluid outlet is in fluid communication with the fluid inlet of the printing system.

2. The replaceable ink container of claim 1 wherein the latch feature is a pair of latch features, and wherein one latch feature of the pair of latch features is on the replaceable ink container adjacent to the first side and another latch feature of the pair of latch features is on the replaceable ink container adjacent to the second side.

3. A replaceable ink container for use with a printing portion of an off axis printing system, the replaceable ink container having a docked position, wherein the replaceable ink container is mounted to the printing portion so as to provide ink to the printing portion, and to provide the printing portion with electrical signals for controlling printing system parameters, the replaceable ink container comprising:

a fluid outlet portion for providing fluid to the printing portion, wherein the fluid outlet portion is mounted rigidly to the ink container and is configured for engaging corresponding guiding features of the printing portion that align the fluid outlet portion with corresponding fluid inlet portions of the printing portion; and an electrical interface portion defined by a cavity within an outer surface of the replaceable ink container, the cavity having a first inner surface defining an engagement portion and a second inner surface having a plurality of electrical contacts thereon for transferring the electrical signals between the replaceable ink container and the printing portion, the engagement portion being separated from and positioned opposite to the plurality of electrical contacts, wherein the electrical interface portion in the docked position engages guiding features of the printing portion to position electrical contact portions of the printing portion between the engagement portion and the plurality of electrical contacts to electrically engage the replaceable ink container with the printing portion without applying a force to the replaceable ink container that would affect engagement of the fluid outlet portion with the corresponding fluid inlet portions of the printing portion.

4. The replaceable ink container of claim 3 wherein the fluid outlet portion is disposed on the outer surface of the replaceable ink container.

5. The replaceable ink container of claim 4 wherein the outer surface of the replaceable ink container is a leading edge defined as that edge of the replaceable ink container first received by the printing portion.

6. The replaceable ink container of claim 5 wherein the leading edge has a longitudinal axis and a lateral axis perpendicular to the longitudinal axis, and wherein the longitudinal axis bisects the fluid outlet portion and the cavity defining the electrical interface portion.

7. The replaceable ink container of claim 6 wherein the fluid outlet portion is at a first end of the longitudinal axis and the cavity defining the electrical interface portion is at a second end of the longitudinal axis opposite the first end.

8. A replaceable ink container for use in an off axis printing system, the printing system being responsive to electrical signals produced by the replaceable ink container for controlling printing system parameters, the replaceable ink container comprising:

a leading edge defined as that edge of the replaceable ink container first received by the printing system, the leading edge having a longitudinal axis and a lateral axis perpendicular to the longitudinal axis;

an electrical interface portion having a plurality of electrical contacts for transferring the electrical signals between the replaceable ink container and the printing system, wherein the electrical interface portion is a cavity within the leading edge of the replaceable ink container, the cavity being bisected by the longitudinal axis and having an inner surface with the plurality of electrical contacts thereon such that the plurality of electrical contacts are configured for engaging a plurality of corresponding electrical printer contacts of the printing system; and a fluid outlet on the leading edge such that the longitudinal axis bisects the fluid outlet, wherein the fluid outlet is separated from the cavity defining the electrical interface portion, with the fluid outlet being in fluid communication with the replaceable ink container and configured for engaging a fluid inlet of the printing system.

9. The replaceable ink container of claim 8, and further including:

an information storage device electrically connected to the plurality of electrical contacts.

10. The replaceable ink container of claim 8 wherein the fluid outlet is configured to receive fluid inlet of the printing system along a fluid interconnect axis, and wherein interengagement of the electrical interface portion with the corresponding electrical printer contacts of the printing system is free from any forces acting on the replaceable ink container in a direction perpendicular to the fluid interconnect axis.

11. The replaceable ink container of claim 8 wherein the electrical interface portion is fixed to the replaceable ink container and the corresponding electrical printer contacts of the printing system float on the printing system.

12. The replaceable ink container of claim 8, and further including:

a latch feature, wherein the replaceable ink container has an unlatched position and a latched position, in the latched position the latch feature is in engagement with corresponding engagement features of the printing system, wherein the plurality of electrical contacts of the electrical interface portion engage the corresponding electrical printer contacts of the printing system, and wherein the fluid outlet is in fluid communication with the fluid inlet of the printing system.

* * * * *